Patented July 3, 1928.

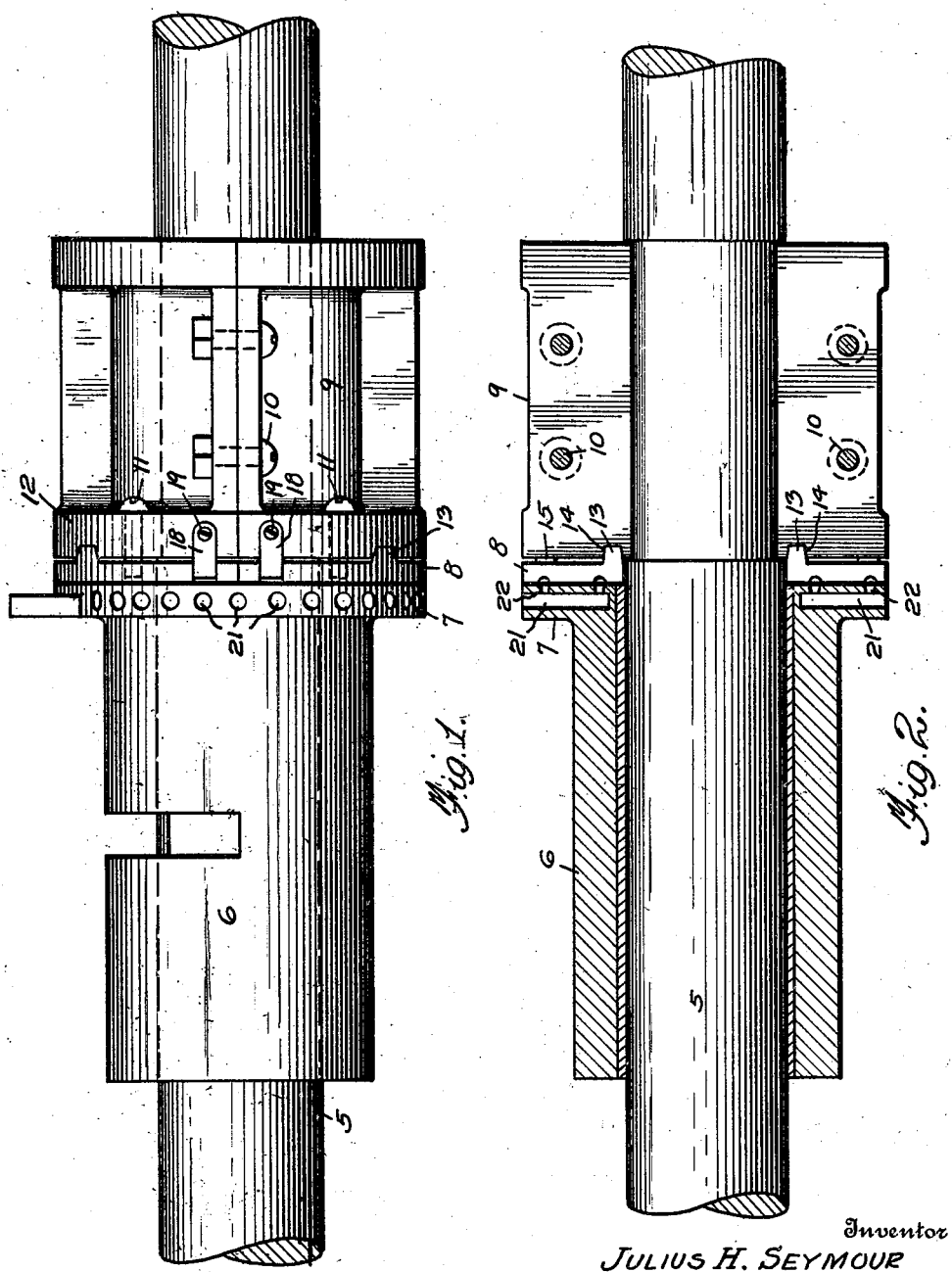

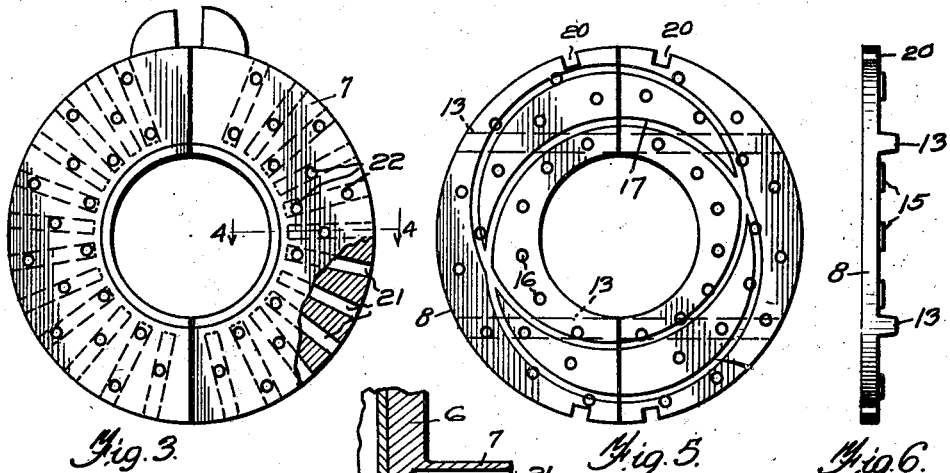

1,676,219

UNITED STATES PATENT OFFICE.

JULIUS H. SEYMOUR AND THOMAS S. SPEAR, OF BARTOW, FLORIDA; SAID SEYMOUR ASSIGNOR TO SAID SPEAR.

THRUST BEARING.

Application filed July 3, 1926. Serial No. 120,422.

This invention relates to thrust bearings and it has for its object to provide an improved device of this nature constructed in such manner as to secure more efficient lubrication of the abutting faces than has heretofore been possible and to provide for more ready dissipation of the heat induced by friction, than has been the case with bearings heretofore employed.

Further objects and advantages of the invention will be set forth in the detailed description which follows.

In the accompanying drawing

Fig. 1 is a side elevation of a bearing constructed in accordance with the invention.

Fig. 2 is a vertical sectional view through said bearing.

Fig. 3 is a face view of the stationary member of the bearing.

Fig. 4 is a sectional view upon line 4—4 of Fig. 3.

Fig. 5 is a face view of the contact plate or washer of the movable member of the bearing.

Fig. 6 is an edge elevation of the structure of Fig. 5.

Fig. 7 is a rear view of the structure of Fig. 5.

Fig. 8 is an end elevation of the abutment or nut constituting a part of the rotative member of the bearing.

Fig. 9 is a modified form of wear plate adapted to be used in lieu of the structure of Fig. 5.

Fig. 10 is an edge elevation of the structure of Fig. 9 and

Fig. 11 is an enlarged sectional view on the line 11—11 of Fig. 9.

Like numerals designate corresponding parts in all of the figures of the drawing.

The thrust bearing of the present invention is particularly adapted for use in connection with centrifugal pumps, though as this description proceeds it will be seen that the invention is by no means limited to that particular use.

It is common practice in centrifugal pumps to provide thrust bearings which run in an oil bath up to the level of the shaft. However, the bearings at present in use do not provide for an adequate feed of the oil to the contacting faces of the bearing, which is one of the primary objects of the present invention.

In the drawing 5 designates a rotative shaft mounted to turn in a fixed element 6, constituting a bearing for said shaft. Bearing 6 is provided with a flange 7 which receives the thrust of a wear plate 8 which is preferably made of babbitt or other antifriction material. Wear plate 8 is carried by an abutment or nut 9, said nut preferably being in two parts and clamped about the shaft 5 by means of the bolts 10. Wear plate 8 is secured to the abutment 9 by screws 11, which pass through the flange 12 of the abutment. By referring to Fig. 7 it will be seen that the wear plate is made in two parts so that it may be placed in position without removing nut 9 from the shaft and without removing the shaft from its bearing. The rear face of the two part wear plate 8 is provided with ribs 13, which take into corresponding channels 14, formed in the flange 12 of nut 9, so that the wear plate is caused to turn bodily with the nut. However, the wear plate is held in spaced relation to the flange 12 by bosses or projections 15, which are located upon the rear face of said wear plate. The wear plate is provided with a number of openings 16, formed therethrough from front to rear, so that oil which enters the space between the wear plate and the flange 12, may pass through the wear plate to the working face thereof, for the efficient lubrication of the same. To aid in the distribution of the oil, oil grooves 16 and 17 are complementally formed in the two parts of the wear plate. Lugs 18, that are secured by screws 19, to the flange 12 of nut 9, enter notches 20 formed in the periphery, the wear plate to aid in the holding and positioning of the same.

The flange 7, of the fixed member of the bearing is provided with a plurality of radial openings 21, for the reception of oil. These openings are connected by oil ducts 22, with the front face of flange 7. Thus the faces of the bearing are efficiently lubricated from both sides.

The spacing of the wear plate 8 from the adjacent face of the flange 12, provides a space 23 which serves the double function of receiving the oil for passage to the face of the wear plate and of providing a heat breaker space, which aids in dissipating the heat induced by friction and to bring about a much more efficient cooling of the bearing than would be the case if this space were not provided.

The modified wear plate of Figs. 9, 10 and 11 is very similar in form to the flange 7; that is, it is provided with a plurality of radial recesses 25, which are connected by oil ducts 26 with the working face of the plate. Ribs 27 and bosses or projections 28, serve the same purpose as the corresponding ribs and bosses 15 of the structure of Fig. 6.

It is to be understood that the invention is not limited to any particular physical structure, because many modifications of the structure may be resorted to, and many ways may be devised of holding the wear plate upon the nut 9 in such manner as to cause the two to move together. As far as we are aware we are the first to provide a wear plate of this character having means of conducting oil therethrough to the working face thereof while mounting the same in such spaced relation to the abutment as to provide a heat breaker space, in the manner herein shown and described. Therefore, we desire to cover this principle broadly. Consequently, it should be understood that the invention includes within its purview whatever changes fairly come within either the terms or the spirit of the appended claim.

Having described our invention what we claim is:

The combination with a rotative shaft of a fixed bearing member in which said shaft rotates, there being peripheral recesses formed in said bearing member, and oil ducts leading from said recesses to the working face of said member, an abutment carried by the shaft, a rotative wear plate secured to the abutment and held in spaced relation thereto, to provide a space between the wear plate and the abutment, there being oil ducts leading from said space through the plate to the working face of the plate.

In testimony whereof they affix their signatures.

JULIUS H. SEYMOUR.
THOMAS S. SPEAR.